(12) United States Patent
Bardouillet

(10) Patent No.: US 8,738,919 B2
(45) Date of Patent: May 27, 2014

(54) CONTROL OF THE INTEGRITY OF A MEMORY EXTERNAL TO A MICROPROCESSOR

(75) Inventor: Michel Bardouillet, Rousset (FR)

(73) Assignee: STMicroelectronics S.A., Montrouge (FR)

( * ) Notice: Subject to any disclaimer, the term of this patent is extended or adjusted under 35 U.S.C. 154(b) by 1006 days.

(21) Appl. No.: 12/106,192

(22) Filed: Apr. 18, 2008

(65) Prior Publication Data

US 2008/0263422 A1   Oct. 23, 2008

(30) Foreign Application Priority Data

Apr. 20, 2007   (FR) ...................................... 07 54591

(51) Int. Cl.
*H04L 9/32*   (2006.01)
(52) U.S. Cl.
USPC ........... 713/176; 713/166; 713/168; 713/177; 713/180; 714/718
(58) Field of Classification Search
USPC ................ 713/170, 176, 177, 180, 166, 168; 714/718
See application file for complete search history.

(56) References Cited

U.S. PATENT DOCUMENTS

| 6,038,317 | A | * | 3/2000 | Magliveras et al. | 380/28 |
|---|---|---|---|---|---|
| 6,212,635 | B1 | * | 4/2001 | Reardon | 713/165 |
| 6,247,151 | B1 | * | 6/2001 | Poisner | 714/718 |
| 6,826,690 | B1 | * | 11/2004 | Hind et al. | 713/186 |
| 6,983,364 | B2 | * | 1/2006 | Gougeon | 713/2 |
| 7,363,495 | B2 | * | 4/2008 | Felt et al. | 713/170 |
| 7,516,327 | B2 | * | 4/2009 | Kawell et al. | 713/171 |
| 7,526,654 | B2 | * | 4/2009 | Charbonneau | 713/188 |
| 7,886,153 | B2 | * | 2/2011 | Miyazawa | 713/176 |
| 7,921,295 | B2 | * | 4/2011 | Kwak et al. | 713/176 |
| 7,996,680 | B2 | * | 8/2011 | Kalibjian et al. | 713/176 |
| 8,225,182 | B2 | * | 7/2012 | Kagan et al. | 714/776 |
| 8,302,167 | B2 | * | 10/2012 | Mennes et al. | 726/5 |
| 8,312,023 | B2 | * | 11/2012 | Shields et al. | 707/742 |
| 8,316,183 | B2 | * | 11/2012 | Lowery | 711/117 |
| 8,438,174 | B2 | * | 5/2013 | Shields et al. | 707/755 |
| 8,504,528 | B2 | * | 8/2013 | Reddy et al. | 707/664 |
| 2002/0035695 | A1 | | 3/2002 | Riches et al. | |
| 2003/0065923 | A1 | * | 4/2003 | Parry | 713/176 |
| 2004/0080998 | A1 | * | 4/2004 | Chang et al. | 365/200 |
| 2004/0186998 | A1 | * | 9/2004 | Kim et al. | 713/169 |
| 2005/0071633 | A1 | * | 3/2005 | Rothstein | 713/167 |
| 2005/0076215 | A1 | * | 4/2005 | Dryer | 713/170 |
| 2005/0125659 | A1 | * | 6/2005 | Sarfati et al. | 713/161 |
| 2006/0047967 | A1 | * | 3/2006 | Akhan et al. | 713/176 |
| 2007/0033467 | A1 | | 2/2007 | Bancel et al. | |

(Continued)

OTHER PUBLICATIONS

French Search Report from French Patent Application 07/54591 dated Sep. 21, 2007.

*Primary Examiner* — Thu Ha Nguyen
(74) *Attorney, Agent, or Firm* — Wolf, Greenfield & Sacks, P.C.

(57) ABSTRACT

A method for recording at least one information block in a first volatile memory external to a circuit, a first digital signature being calculated based on information and data internal to the circuit and a second digital signature being calculated based on first signatures of a group of information blocks and on a digital quantity internal to the circuit and assigned to said group. A method for checking the content of an information block recorded by this recording method.

42 Claims, 3 Drawing Sheets

(56) References Cited

U.S. PATENT DOCUMENTS

| | | | |
|---|---|---|---|
| 2007/0079139 A1* | 4/2007 | Kim | 713/186 |
| 2007/0277246 A1* | 11/2007 | Kawell et al. | 726/27 |
| 2007/0294738 A1* | 12/2007 | Kuo et al. | 725/116 |
| 2008/0126429 A1* | 5/2008 | Kalibjian et al. | 707/200 |
| 2008/0260287 A1* | 10/2008 | Berryman et al. | 382/284 |
| 2008/0263422 A1* | 10/2008 | Bardouillet | 714/732 |
| 2009/0164517 A1* | 6/2009 | Shields et al. | 707/104.1 |
| 2009/0235339 A1* | 9/2009 | Mennes et al. | 726/5 |
| 2010/0094817 A1* | 4/2010 | Ben-Shaul et al. | 707/697 |
| 2010/0185827 A1* | 7/2010 | Lowery | 711/165 |
| 2010/0217948 A1* | 8/2010 | Mason et al. | 711/171 |
| 2010/0251385 A1* | 9/2010 | Fellers et al. | 726/28 |
| 2010/0287196 A1* | 11/2010 | Shields et al. | 707/769 |
| 2010/0317420 A1* | 12/2010 | Hoffberg | 463/1 |
| 2011/0072278 A1* | 3/2011 | Izu et al. | 713/193 |
| 2011/0083064 A1* | 4/2011 | Kagan et al. | 714/807 |
| 2011/0113013 A1* | 5/2011 | Reddy et al. | 707/646 |
| 2011/0208969 A1* | 8/2011 | Kuhlman | 713/176 |
| 2011/0238430 A1* | 9/2011 | Sikorski | 705/1.1 |
| 2012/0221859 A1* | 8/2012 | Marien | 713/172 |
| 2012/0246535 A1* | 9/2012 | Kagan et al. | 714/752 |
| 2012/0331553 A1* | 12/2012 | Aziz et al. | 726/23 |
| 2013/0061110 A1* | 3/2013 | Zvibel | 714/758 |
| 2013/0073949 A1* | 3/2013 | Barrell et al. | 715/234 |

\* cited by examiner

CONTROL OF THE INTEGRITY OF A MEMORY EXTERNAL TO A MICROPROCESSOR

BACKGROUND OF THE INVENTION

1. Field of the Invention

The present invention generally relates to electronic circuits and, more specifically, to microprocessors exploiting an external memory. "External memory" means a memory connected to the processor by communication buses accessible for a measurement of the electric signals, for example, by a possible person attempting to fraud.

The present invention more specifically applies to the checking of the integrity (the absence of modification between the writing and the reading thereof) of information contained in an external volatile memory for processing by a microprocessor.

2. Discussion of the Related Art

A solution to check the integrity of the content of a memory read by a microprocessor is known as the CRC (Cyclic Redundancy Check) and comprises storing, with the content of a block in the memory, a value representative of this content. This value is then checked on reading to detect possible errors in the content of the memory block. Such a solution may be efficient to detect incidental errors but is not efficient against a possible hacking. Indeed, it is enough for the hacker to know the CRC value calculation mode to be able to force the system with erroneous data, accompanied with a CRC value which will have been calculated by the hacker himself and which will be admitted by the system.

Another solution comprises ciphering the entire memory content by means of a ciphering algorithm executed by the microprocessor. On reading, the data extracted from the memory are then deciphered by the microprocessor. Such a solution does not prevent the introduction of erroneous data, for example, in a fraud attempt by fault injection into the program execution, since the data or instructions will anyway be deciphered by the processor.

A third solution is based on the calculation of a signature with a key (MAC—Message Authentication Code) or with no key (hash function), and comprises calculating the result of a cryptographic algorithm. US patent application no 2006/0253708 describes an example of a solution with a key. This solution provides good results but requires storing a large number of data (one per memory line) on the microprocessor side. Such storage spaces are not always available.

U.S. Pat. No. 6,247,151 discloses a method for verifying the integrity of data stored in a memory, two signatures respectively taking into account a data and a copy of it in another memory area are generated.

SUMMARY OF THE INVENTION

The present invention aims at overcoming all or part of the disadvantages of known methods and devices for controlling the integrity of a memory external to a microprocessor.

An object more specifically is a storage-space-saving solution on the microprocessor side.

Another object is a solution compatible with usual algorithms of message authentication code (MAC) calculation or the like.

Another object is a solution adapted to an external memory of RAM type.

To achieve all or part of these objects as well as others, an embodiment of the present invention provides a method for recording at least one information block in a first volatile memory external to a circuit, in which:

a first digital signature is calculated based on information and data internal to the circuit; and a second digital signature is calculated based on first signatures of a group of information blocks and on a digital quantity internal to the circuit and assigned to said group.

According to an embodiment, the second signature is stored internally to the microprocessor.

According to an embodiment, the first signature is stored in the external memory.

According to an embodiment, the digital quantity changes for each group.

According to an embodiment, the second signature uses no key.

The present invention also provides a method for checking the content of at least one block of information read from a volatile memory external a circuit, in which:

a first signature stored in the external memory on recording of said block is compared with a first current signature; and a second signature stored internally to the circuit is compared with a second current signature, said signatures being calculated in accordance with the recording method.

According to an embodiment, an integrity of the data block is validated only in case of an identity of the first current and stored signatures, and of the second current and stored signals.

The present invention also provides a controller of the intensity of information stored in a non-volatile memory external to a circuit containing the controller.

The present invention also provides a microprocessor comprising signature calculation means for the storage of an information bloc in a volatile memory external to this microprocessor.

The foregoing and other objects, features, and advantages of the present invention will be discussed in detail in the following non-limiting description of specific embodiments in connection with the accompanying drawings.

DETAILED DESCRIPTION

Figure 1:
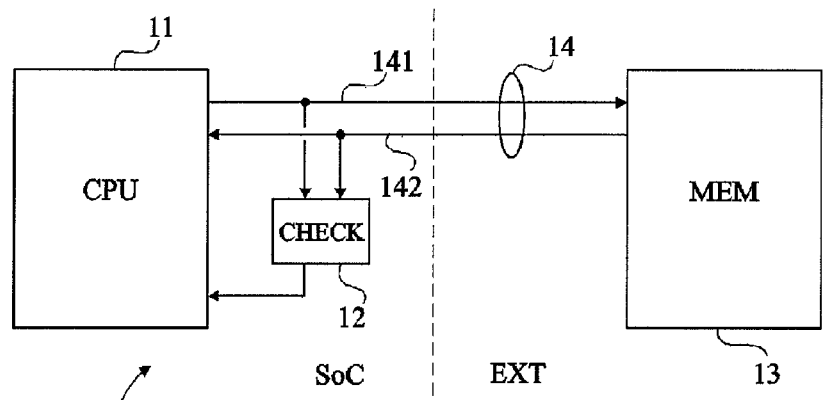
FIG. 1 shows an architecture of a microprocessor and of an external memory of the type to which the present invention applies as an example.

The same elements have been designated with the same reference numerals in the different drawings.

For clarity, only those steps and elements useful to the understanding of the present invention have been shown in the drawings and will be described. In particular, the details constitutive of the microprocessor have not been discussed, the present invention being compatible with any conventional microprocessor. Similarly, the mechanisms for addressing and exploiting information read from or written into an external memory by a microprocessor have not been detailed, the present invention being here again compatible with usual mechanisms.

FIG. 1 is a block diagram of an architecture of the type to which the present invention applies as an example. An integrated system (SoC—System on Chip), for example, a microprocessor 1 comprises, among others, a central processing unit 11 (CPU) and, in the field of application of the present invention, a function 12 (CHECK) for checking the integrity of data read by the microprocessor from a memory 13 (MEM) outside (EXT) of circuit 1. Unit 11 communicates with memory 13 (and with other elements, not shown) over several buses 14 among which an address bus 141, a data bus 142, and a control bus, not shown. Memory 13 preferably is a RAM, called a working memory, in which are stored data enabling the microprocessor to execute a program. These may be written and read variables or program instructions transiting through the work memory from a ROM (not shown) for execution thereof. It is considered that central unit 11 and integrity controller 12 are in a secure area of the microprocessor, that is, the data transiting through this area (or remaining therein) need not be checked as to their integrity. However, memory 13 is considered in a non-secure or open environment, which justifies checking whether the data which are read therefrom are effectively identical to those which have been written into it. In practice, memory 13 is most often contained in a different circuit than microprocessor 1, but it may also be in the same circuit by being external to an area considered as secure.

A difference between the written and read data may result from a fraud attempt by a possible hacker or an incidental malfunction. In both cases, it is useful for the microprocessor to be able to detect that the data that it is about to process do not correspond to those which have been previously stored.

According to an embodiment, the data contained in work memory 13 are, by block, associated with a first integrity control authentication code or signature (MAC) stored outside of microprocessor 1 (for example, in external memory 13). A second authentication or integrity control code (MAC'), stored internally to the microprocessor, is a function, not of the data, but of the external authentication codes MAC of a group of memory blocks. The need for storage inside of the microprocessor is thus decreased without adversely affecting the security. After, a memory line will be taken as an example as a granularity, that is, the size of a block on which the externally-stored signature is calculated corresponds to the size of a line. In the drawings, the internal portions (secure, of the system) and the external portions (non secure) have been separated by dotted lines to better illustrate the elements and steps needed on both sides.

Figure 2:
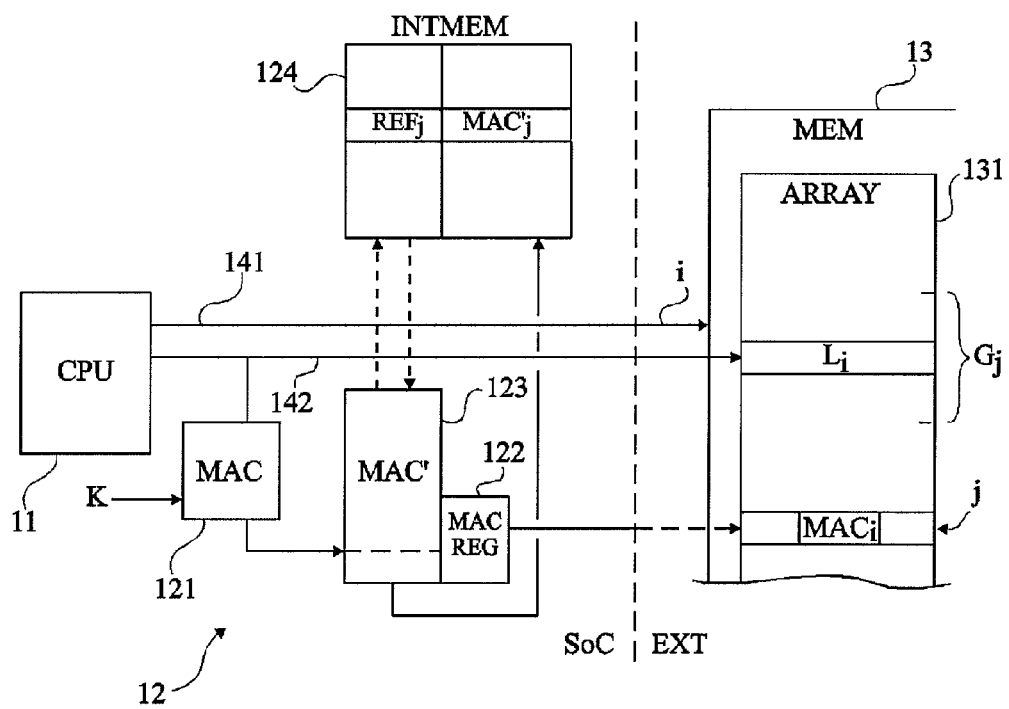
FIG. 2 is a block diagram of elements of an embodiment of a controller of the write integrity of data in a memory external to a microprocessor.

FIG. 2 illustrates an embodiment of an integrity controller equipping an integrated system (System on Chip—SoC), for example, a microprocessor, to control the integrity of data temporarily stored in external memory 13. FIG. 2 illustrates the elements implied on writing of a data line $L_i$ of address i in memory plane 131 (ARRAY).

Figure 3:
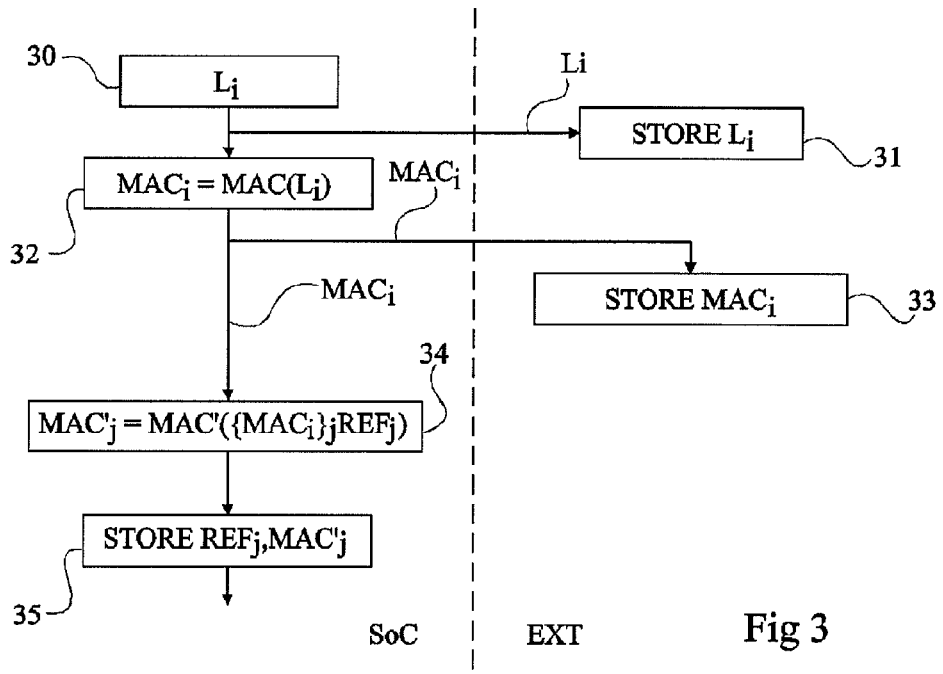
FIG. 3 illustrates steps of an integrity control method on writing into a memory.

FIG. 3 is a simplified flowchart illustrating the operation of the integrity controller of FIG. 2 in a write operation.

Integrity controller 12 comprises a function 121 for calculating a message authentication code (MAC) or more generally any integrity code of signature type. This block receives, for example, a key K specific to the integrated circuit. As a variation, it may be a session key of a program or more generally any known code of circuit 1. When a data line $L_i$ is provided by unit 11 (block 30, FIG. 3) for storage in memory 13 (block 31, STORE $L_i$), calculation function 121 is applied to data $L_i$ (block 32, $MAC_i=MAC(L_i)$) to be stored. For simplification, the case of a physical address i carried by bus 141 is considered, be this address directly provided by central unit 11 or be it a converted virtual address.

First signature $MAC_i$ associated with data line $L_i$ and provided by function 121 is stored (block 33, STORE $MAC_i$) in an area of memory plane 131 with all the signatures associated with a group $G_j$ of memory lines. The size of the group is conditioned by the size of a block (a line j) of signatures. The signatures calculated for the successive lines $L_i$ of group $G_j$ are temporarily stored in a register 122 (MAC REG) of circuit 12. If the granularity of the writing into the memory is finer than that of a signature group, it is however possible to perform the writings successively without waiting for the calculation of all the signatures in the group.

Internally to system 1, a reference word $REF_j$ associated with group $G_j$ of lines is used by a generator 123 of a signature (MAC') associated with the group. Generator 123 calculates (block 34, $MAC'_j=MAC'(\{MAC_i\}, REF_j)$) a signature of a group of message authentication codes $MAC_i$ by associating reference REF therewith. This calculation needs not take into account any secret key since code MAC' remains internal to system 1. Code MAC' is, for example, stored (block 35, STORE $REF_j$, $MAC'_j$) with reference $REF_j$ used for its calculation, in volatile storage elements 124 (INTMEM), internal to the microprocessor (for example, a RAM, registers, etc.). Reference word $REF_j$ is, for example, a random number drawn on each writing of a line into the memory. As a variation, word REF is the value of a counter incremented for each new information to be stored.

Figure 4:
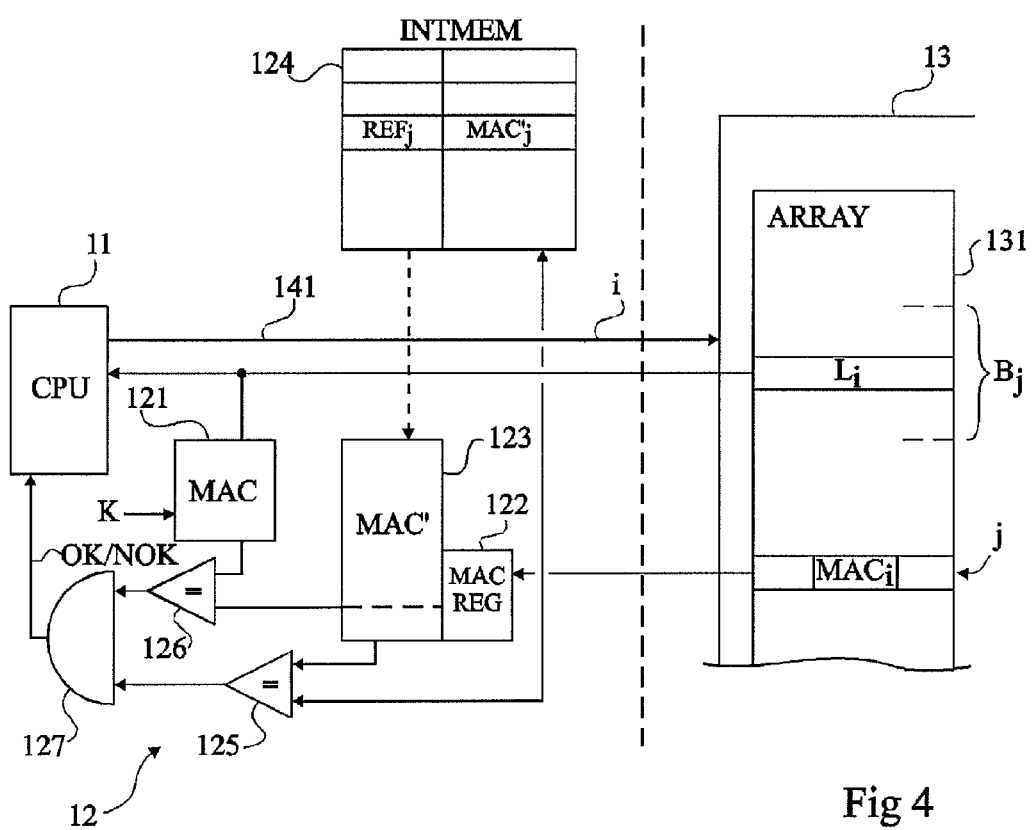
FIG. 4 is a block diagram of an embodiment of a controller of the read integrity of data in a memory external to a microprocessor.

FIG. 4 illustrates an embodiment of an integrity controller showing the elements used on reading of data from memory 13 to control that these data have not been modified since their storage.

Figure 5:
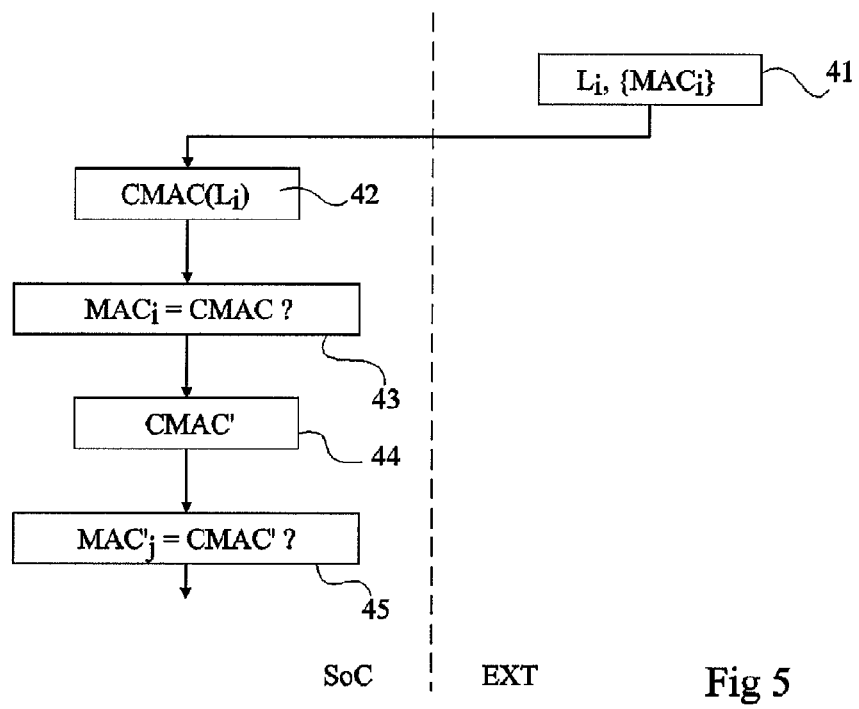
FIG. 5 illustrates the steps of an integrity control method on reading of data from a memory.

FIG. 5 illustrates, in a simplified flowchart, the operation of the read mechanism of FIG. 4.

When an address i of a data line $L_i$ in memory 13 is provided by central unit 11 on address bus 141 (FIG. 4), the memory, via its controller, provides (FIG. 5, block 41, $L_i$, $\{MAC_i\}$) not only data line $L_i$ to the processor but also line j of signatures $\{MAC_i\}$ of all lines $L_i$ of group $G_j$. Such signatures $MAC_i$ are stored in register 122 to be exploited by integrity controller 12. A first current signature CMAC of data line $L_i$ is calculated (block 42, $CMAC(L_j)$) by function 121. Based on the reference of block j, identifiable by the integrity controller, signature $MAC'_j$ of the block is read from internal memory 124 and a current signature CMAC' is calculated (block 44) based on first signatures $\{MAC_i\}$ extracted from line j of the memory and from reference word $REF_j$. In parallel or successively, signature CMAC is compared (block 43, $MAC_i=CMAC?$) with signature $MAC_i$ read from line j (comparator 126) and signature CMAC' is compared (block 45, $MAC'_j=CMAC'?$) with signature $MAC'_j$ (comparator 125). The integrity controller provides a validation signal (OK/NOK), for example, to central unit 11, the state of which only corresponds to a validation if the states provided by comparators 125 and 126 both demonstrate a signature identity (for example, by a logic AND-type gate 127). The actions taken by the microprocessor after the validation signal are usual (for example, a blocking in the case of a lack of validation and/or an authorization to continue the program in case of a validation, etc.).

An advantage is that the function of calculation of second signature MAC' may be simple since all its elements remain internal to the secure system.

This especially enables fast read checking in the memory. Such a mechanism is in particular faster than mechanisms known as the "Merkel tree" which comprise performing successive signature calculations based on the previous signatures. Such mechanisms require a very large number of calculations.

Another advantage of the provided mechanism is that a single number (for example, random) is required per signature group.

As a specific example of embodiment, signature MAC' is calculated from a diffusion or hash function (HASH), for example, an XOR-type combination of signatures $MAC_i$ of group j and reference $REF_j$. Specific embodiments of the present invention have been described. Various alterations and modifications will occur to those skilled in the art. In particular, the adaptation and the selection of the sizes of codes MAC or MAC' depends on the size of the manipulated data and on the size of the data storable in the memory. Further, the selection of the calculation function to be used and of the signature size depends on the desired security and, preferably, on the functions available on the processor side. Further, the provided solution may be combined with other integrity control solutions.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for recording data in a first volatile memory external to a circuit, the method comprising:
    calculating a plurality of separate first digital signatures, wherein each first signature is calculated from a respective information block of a group of information blocks and additional a first data value that is stored and used only internal to the circuit;
    calculating, for the group of information blocks, a second digital signature from the plurality of first digital signatures and from a digital quantity assigned to said group, wherein the digital quantity is different from the first data value; and
    storing the second digital signature only internally to the circuit.

2. The method of claim 1, wherein the digital quantity represents a random number.

3. The method of claim 1, wherein the plurality of first digital signatures are stored in the external memory.

4. The method of claim 1, wherein the digital quantity changes for each group.

5. The method of claim 1, wherein the second signature uses no key.

6. A method for checking the content of at least one block of information read from a volatile memory external to a circuit, wherein:
    a first signature stored in the external memory on recording of said block is compared with a first current signature; and
    a second signature stored internally to the circuit is compared with a second current signature, said signatures being calculated according to the method of claim 1.

7. The method of claim 6, wherein an integrity of the data block is validated only in case of an equivalence of the first current and first stored signatures, and of the second current and second stored signatures.

8. A controller of the integrity of information stored in a non-volatile memory external to a circuit containing the controller, comprising apparatus for implementing the method of claim 1.

9. A microprocessor comprising signature calculation apparatus for the storage of an information block in a volatile memory external to this microprocessor, comprising means for implementing the method of claim 1.

10. A method comprising:
    receiving a group of separate first digital signatures from temporary memory in a first circuit, wherein the first digital signatures are each calculated from an information block and a first data value that is stored and used only internally to the first circuit;
    calculating, by the first circuit, an authenticating digital signature from the group of separate first digital signatures and a digital quantity that is different from the first data value and is assigned to the group;
    storing the authenticating digital signature only internally to the first circuit; and
    removing the first digital signatures from the temporary memory.

11. The method of claim 10 wherein the authenticating digital signature and first digital signatures are calculated for a plurality of the information blocks for verifying the integrity of the data blocks.

12. The method of claim 10, wherein the digital quantity is changed from a previous value used to calculate an authenticating digital signature for a previous group of first digital signatures.

13. The method of claim 10, wherein the digital quantity is selected according to random number selection.

14. The method of claim 10, further comprising:
    calculating, by the first circuit, the first digital signatures for a plurality of the information blocks; and
    transmitting the group of first digital signatures and the plurality of information blocks to a second circuit that is external to the first circuit.

15. The method of claim 14, wherein the second circuit is external to an area of the first circuit that is considered secure.

16. The method of claim 14, further comprising:
    receiving, by the first circuit, the group of first digital signatures from the second circuit;
    calculating a verification digital signature based upon the received group of first digital signatures and the digital quantity; and
    comparing the verification digital signature to the authenticating digital signature.

17. A method comprising:
    receiving, by a first circuit, a plurality of separate first digital signatures from a second circuit that is external to the first circuit, wherein the first digital signatures have been each calculated from an information block of a group of information blocks and from a first data value that is stored and used only internally to the first circuit;
    calculating, by the first circuit, a verification digital signature from the plurality of separate first digital signatures and a digital quantity that is different from the first data value and assigned to the plurality of separate first digital signatures; and
    comparing the verification digital signature against an authenticating digital signature that is stored only internally to the first circuit and that has been previously calculated for the group of information blocks.

18. The method of claim 17, wherein the digital quantity is used as a reference for the group of information blocks.

19. The method of claim 17, wherein the plurality of first digital signatures has been received from a second circuit that is external to an area of the first circuit considered to be secure.

20. The method of claim 17, wherein the digital quantity varies for each act of calculating a verification digital signature for each received group.

21. An apparatus comprising a first circuit configured to:
calculate each first digital signature of a plurality of separate first digital signatures from a respective data block in a group of data blocks and from a first data value that is stored and used only internally to the first circuit;
receive the plurality of separate first digital signatures from temporary memory in the first circuit;
calculate an authenticating digital signature from the plurality of separate first digital signatures and from a digital quantity that is different from the first data value;
store the authenticating digital signature only internally to the first circuit; and
remove the plurality of first digital signatures from the temporary memory.

22. The apparatus of claim 21, wherein the authenticating digital signature and first digital signatures are calculated for a plurality of data blocks for verifying the integrity of the data blocks.

23. The apparatus of claim 21, wherein the first circuit is configured to change the digital quantity from a previous value used to calculate an authenticating digital signature for a previous group of first digital signatures.

24. The apparatus of claim 21, wherein the first circuit is further configured to select the digital quantity according to random number selection.

25. The apparatus of claim 21, wherein the first circuit is further configured to:
store the digital quantity internal to the first circuit in association with the authenticating digital signature; and
transmit the group of first digital signatures and the plurality of data blocks to a second circuit that is external to the first circuit.

26. The apparatus of claim 25, wherein the second circuit is external to an area of the first circuit that is considered secure.

27. The apparatus of claim 25, wherein the first circuit is further configured to:
receive the group of first digital signatures from the second circuit;
calculate a verification digital signature based upon the received group of first digital signatures and the digital quantity; and
compare the verification digital signature to the authenticating digital signature.

28. An apparatus comprising a first circuit configured to:
generate a digital quantity;
calculate an authentication digital signature from a plurality of separate first digital signatures and the digital quantity;
store the authentication digital signature in association with the digital quantity only internally to the first circuit;
transmit the plurality of separate first digital signatures to a second circuit;
receive the plurality of separate first digital signatures from the second circuit; and
calculate a verification digital signature from the received plurality of separate first digital signatures and from the digital quantity stored in the first circuit.

29. The apparatus of claim 28, wherein the digital quantity is representative of a random number or a counter increment.

30. The apparatus of claim 28, wherein the second circuit is external to an area of the first circuit considered to be secure.

31. The apparatus of claim 28, wherein the digital quantity varies for each act of calculating an authentication digital signature.

32. Manufactured computer-readable medium storage device comprising instructions readable by a processor that, when executed by the processor, adapt the processor to:
calculate each first digital signature of a plurality of separate first digital signatures from a respective data block of information and from a first data value that is stored and used only internally at a first circuit,
receive a group of the separate first digital signatures from temporary memory in the first circuit;
assign a digital quantity to the group;
calculate an authenticating digital signature from the group of separate first digital signatures and from the digital quantity;
store the authenticating digital signature only internally to the first circuit; and
remove the group of separate first digital signatures from the temporary memory.

33. The manufacture of claim 32, wherein the authenticating digital signature and first digital signatures are calculated for a plurality of data blocks for verifying the integrity of the data blocks.

34. The manufacture of claim 32, further including instructions that adapt the processor to change the digital quantity from a previous value used to calculate an authenticating digital signature for a previous group of first digital signatures.

35. The manufacture of claim 32, further including instructions that adapt the processor to select the digital quantity according to random number selection.

36. The manufacture of claim 32, further including instructions that adapt the processor to:
store the digital quantity in association with the authenticating digital signature; and
initiate transmission of the group of first digital signatures and a respective plurality of data blocks to a second circuit that is external to the first circuit.

37. The manufacture of claim 36, wherein the second circuit is external to an area of the first circuit that is considered secure.

38. The manufacture of claim 36, further including instructions that adapt the processor to:
receive the group of first digital signatures from the second circuit;
calculate a verification digital signature based upon the received group of first digital signatures and the digital quantity; and
compare the verification digital signature to the authenticating digital signature.

39. Manufactured computer-readable medium storage device comprising instructions readable by a processor that, when executed by the processor, adapt the processor to:
generate a digital quantity;
calculate an authentication digital signature from a plurality of separate first digital signatures and the digital quantity;
store the authentication digital signature in association with the digital quantity only internally to the first circuit;
transmit the plurality of separate first digital signatures to a second circuit;
receive the plurality of separate first digital signatures from the second circuit;

calculate a verification digital signature from the plurality of received separate first digital signatures and the digital quantity; and compare the verification signature against the authentication signature.

40. The manufacture of claim 39, wherein the digital quantity is representative of a random number or a counter increment.

41. The manufacture of claim 39, wherein the group of first digital signatures has been received from a second circuit that is external to an area of the first circuit considered to be secure.

42. The manufacture of claim 39, wherein the digital quantity varies for each act of calculating an authentication digital signature.

* * * * *